Patented Oct. 3, 1922.

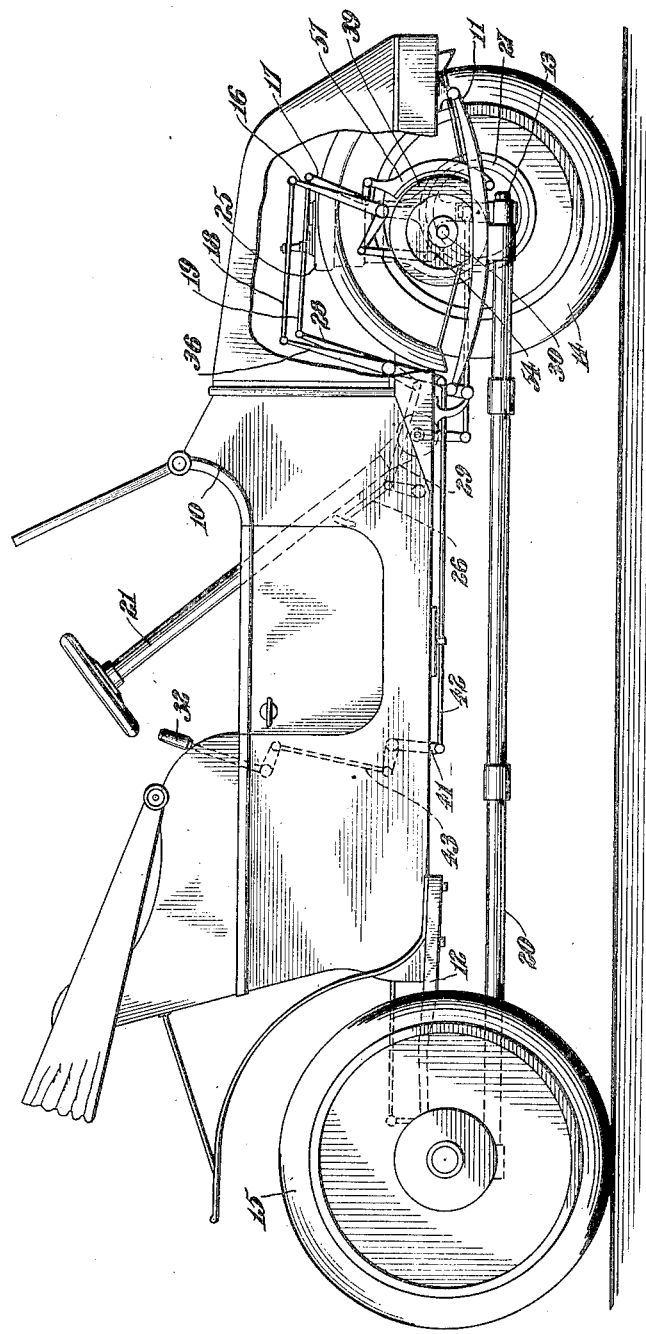

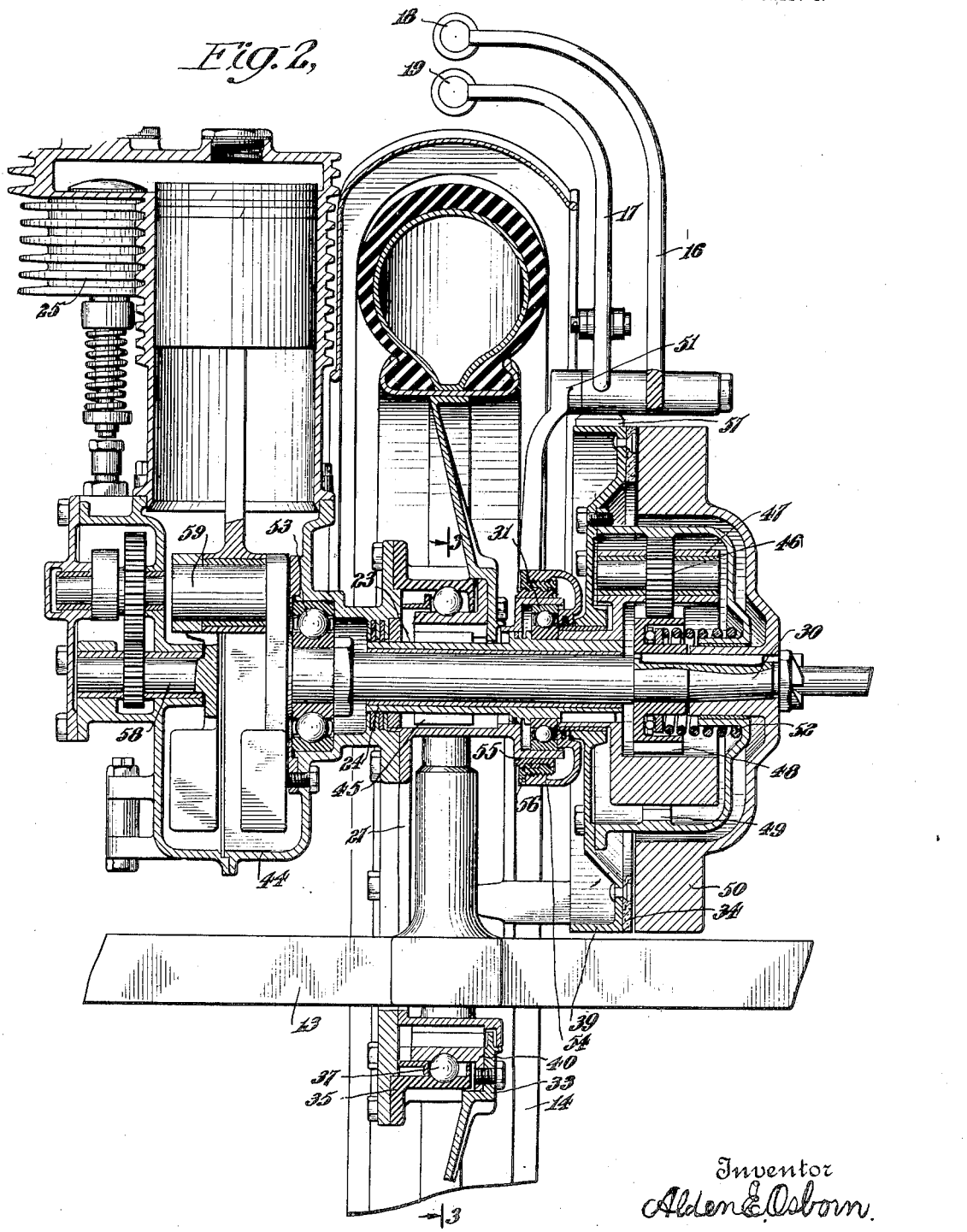

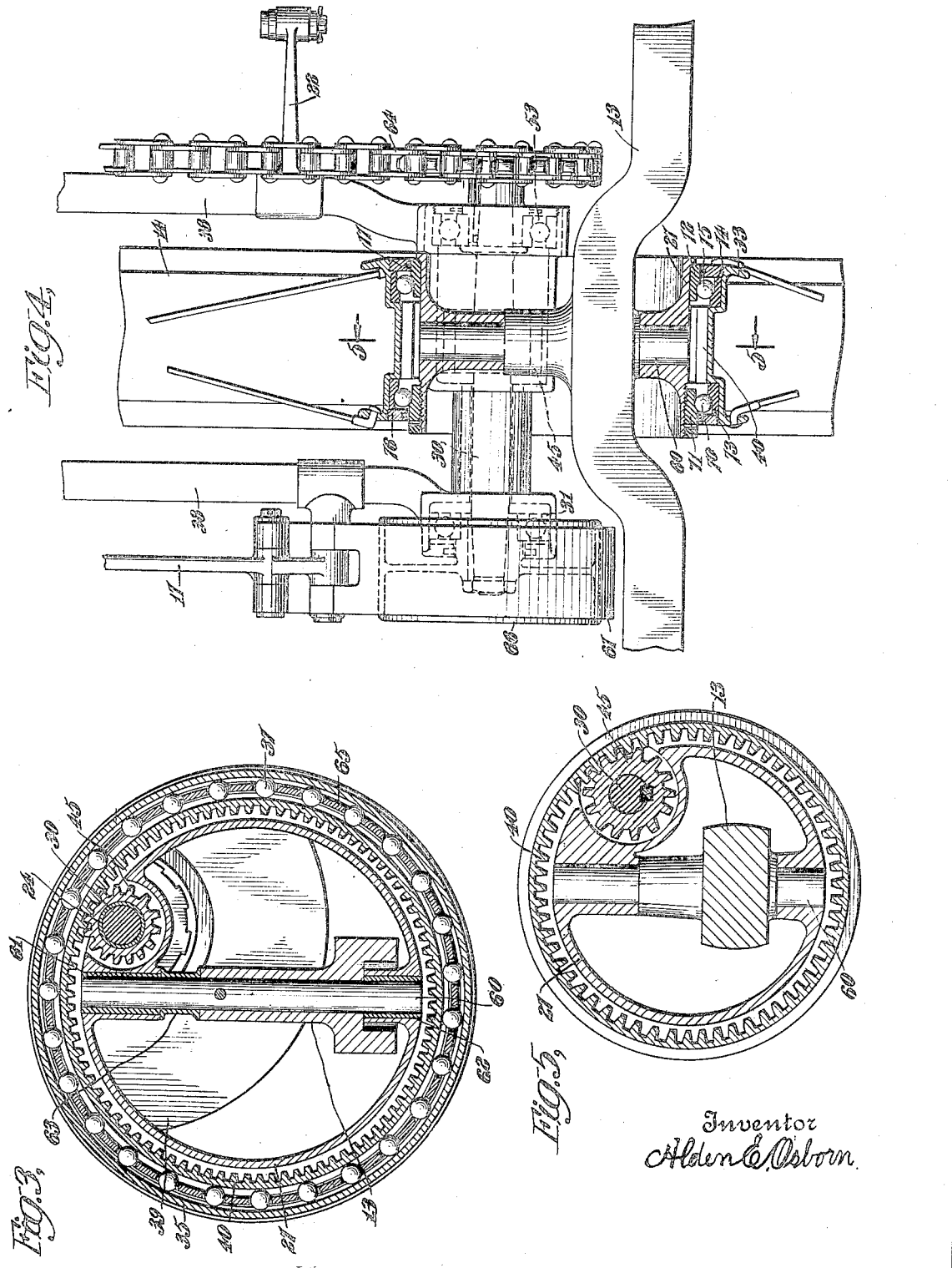

1,430,676

UNITED STATES PATENT OFFICE.

ALDEN E. OSBORN, OF NEW YORK, N. Y.

MOTOR VEHICLE.

Application filed March 25, 1921. Serial No. 455,467.

*To all whom it may concern:*

Be it known that I, ALDEN E. OSBORN, a citizen of the United States of America, and a resident of New York, county of the Bronx, and State of New York, have invented certain new and useful Improvements in a Motor Vehicle, of which the following is a specification.

This invention relates to a type of motor vehicle in which a combined traction and steering wheel is employed which wheel is rotatably carried on a wheel supporting member that is pivotally mounted on the axle within the hub of the wheel. It differs from other devices of this character and has important advantages over them because of the fact that the main power transmitting shaft connected to the propelling motor or engine is carried by the wheel support inside of the hub of the wheel, to which it is geared, and moves about with the support when it is swung around its pivot for steering. This arrangement permits an exceedingly simple and cheap vehicle to be constructed while at the same time it would be very strong and serviceable and economical to run. By passing the main drive shaft through the pivoted wheel support and within the wheel hub as provided for in this invention a very direct and efficient transmission of the power between the shaft and wheel is possible and the weight of the motor or engine, which may be mounted on the wheel support at one side of the wheel and directly connected to the driving shaft, can be counter balanced by the weight of the speed change gear and fly-wheel which may be mounted on this drive shaft at the other side of the wheel thus eliminating the strain on the parts that would occur if a heavy weight were carried at one side of the wheel only.

In the accompanying drawings I have, for the purposes of disclosure, illustrated my invention in two forms only but I would have it understood that it is susceptible of embodiment in other forms without departure from the true spirit and scope of the invention as defined in the appended claims. In these drawings:

Figure 1 represents a side elevation of a motor vehicle embodying one form of my invention.

Figure 2 represents a sectional elevation of the front wheel mechanism of Fig. 1 taken approximately on the line of main driving shaft.

Figure 3 represents a sectional side elevation of the mechanism of Fig. 2 taken on the line 3—3.

Figure 4 represents a sectional elevation of a modification of the mechanism shown in Fig. 2 taken approximately on the line of the pivotal mounting of the wheel support on the axle, and Figure 5 represents a sectional side elevation of the mechanism of Fig. 4 taken on the line 5—5.

Similar numerals of reference indicate similar parts in all the figures.

Referring to Fig. 1 it will be noticed that I have illustrated my invention applied to a three wheeled vehicle in which an underframe or main frame 20 is employed to connect the front axle 13 with the rear axle and that the body 10, which may be of any type desired, is supported by front and rear springs 11 and 12. Should, however, it be thought desirable the frame 20 may be omitted and the body or framing attached thereto can be made to perform its function. The front axle 13 is carried by the wheel support 27, which is pivotally mounted thereon, that in turn is carried by the combined traction and steering wheel 14 while the rear axle (not shown in the drawings) carriers the two supporting wheels 15 at each end. In order to steer the vehicle a suitable steering mechanism 21 is provided which is connected to and acts on the wheel support to slue the same to steer the vehicle by any desired means. The wheel support 27, in this form of my invention, carries the propelling motor or engine 25 on one side of the wheel 14 while on the other side of the wheel 14 it carries the transmission or speed change gear 39 and the flywheel of the engine. As this transmission gear as well as the engine oscillate with the wheel 14 when steering it is necessary that the control connections thereto will allow of such movement and it is obvious that the well known Bowden type of wire mechanism can be employed. I have, however, as this Bowden flexible control wire system might not be considered desirable for operating the controlling devices which move with the wheel that are hard to actuate such as the brake or transmission control or the clutch, illustrated in this Fig. 1 a method of moving these parts that eliminates the use of such wire and permits rods and levers to be used. The parts, which are to be controlled by the driver and are carried by the wheel support 27, consisting, in the case of the vehicle shown in Fig. 1 of the transmission brake shoe 57 and the clutch operating lever 54, are connected to the levers 16 and 17 which levers are pivotally mounted on the wheel support and have their ends, to which the operating rods 18 and 19 are pivotally joined by a suitable ball or other joint allowing universal movement, curved over the top of the wheel so that this joint between the rods and levers moves on a line intersecting the line of the pivot axis of the wheel support. The range of movement of the jointed ends of the levers would be such that the joint would come approximately in line with the line of the axis of pivoting of the wheel support 27 when the parts, carried by the support and connected to the levers, are in operative position so that the oscillation of the support when steering would not have any effect on the levers or change the action of the mechanism they control when they are in this position while, when they are in a position in which the parts on which they act are released, the slight movement to which they are subjected through the joint being out of line with the wheel support pivot axis when the support is turned, would not have any effect. The rods 18 and 19 may be moved by any convenient means but I have shown one of them connected to a pedal 26 by the lever 28 and rod 29 and the other connected to the hand lever 32 by the levers 36 and 41 and rods 42 and 43.

In order to make the construction of the front axle, the wheel support and the wheel driving mechanism clear I will now refer particularly to Fig. 2. In this figure the motor or engine 25 is shown as of the ordinary four-cycle internal combustion type designed for use with my invention having a main or crank shaft 30 which extends on the traction wheel side of the engine a considerable distance therefrom and having a crank case 44 adapted to be bolted to one side of the wheel support 27. The wheel support also has bolted to it the stationary bearing ring 35 containing the ball bearing 37 which in turn runs in a suitable groove on the exterior of the internal hub gear 40 that is bolted to and carries the hub 33 of the wheel 14. The wheel support 27, which has its pivotal mounting on the axle 13 back of the line on which this sectional view is taken, carries a suitable bracket 51 on which the levers 16 and 17 are mounted and also a socket for containing the bearing 31 that supports the outer end of the main shaft through the sleeve 23 which has a bearing 24 about the shaft. The main shaft is also supported by the bearing 53 in the engine crank case and by, if desired, additional crank shaft bearings although in this drawing it is shown as of the overhanging crank type as the extension 58 is a slip fit on the crank pin 59 and simply serves to drive the engine valve mechanism. The sleeve 23 is formed with pinion gear teeth 45 which mesh with the internal hub gear 40 so that the power is transmitted to the wheel 14 in a very simple and efficient manner. In order to transmit the power between the main or crank shaft 30 and this sleeve 23 I have shown a planetary type of speed change gear and disc clutch mounted on the shaft between the fly wheel 50 and traction wheel 14 but it should be clearly understood that this speed change or transmission gear can be omitted altogether and the sleeve 23 or pinion 45 fastened directly to the shaft (as would be the case when an electric motor was substituted for the internal combustion engine 25) or that other types of speed change or transmission gears can be used. The gear shown in this figure is, however, practically the same as that illustrated and described in my co-pending application for a patent on a motor vehicle, Serial No. 411,347, filed September 18, 1920, and comprises briefly a driving gear 48 on the main shaft 30, a pinion 46 rotatably mounted on the member 47 fastened to the sleeve 23 and an internal gear 49 which carries one member 34 of the disc clutch and is normally pressed by the spring 52 so as to bring this clutch surface 34 into forcible contact with the surface of the flywheel 50. In order to disengage these clutch surfaces, so that the engine can run free or the low speed obtained by restraining the rotation of the internal gear 49 through the action of the brake shoe 57 on the drum 39, I have provided, as in the above named application, an internally threaded collar 56 cooperating with the externally threaded ring 55 on the wheel support 27 which collar is arranged to move the parts longitudinally when it is rotated by the lever 54. A slight simplification has been made in that the collar 56 acts against the sleeve bearing 31 instead of against a separate thrust bearing thus eliminating this thrust bearing. As the object of Fig. 2 is to illustrate particularly the construction on the line of the main shaft it does not show very clearly the pivotal mounting of the wheel support and I have in Fig. 3 disclosed this matter more effectively as well as the form of the wheel support and the arrangement of the gearing and of the wheel bearing. The axle 13 is provided with a substantially vertical pivot pin 60 that projects into the upper wheel support bushing 61 and into the lower wheel support bushing 62 which latter bushing extends upward into a socket in the axle 13 in order to give it more bearing surface. In order to permit the removal of the wheel support from the axle a spacing collar 63 is provided so that when the pivot pin 60 is removed the support can be dropped so that its lower hub for the pivot pin will clear the axle. In order to disassemble the wheel bearing the ball separator 65 is removed and the balls 37 displaced to one side of grooved rings 35 and 40 when the parts can readily be separated the same as is the case with other annular ball bearings.

In the modified form of my invention shown in Fig. 4 I have illustrated a different form of wheel mounting in that I have provided two separate ball bearings 70 and 75 on each side of the internal hub gear 40 and have arranged these bearings so that they can be adjusted by means of a threaded cone ring 71—the other cone ring 72 being forced up against a shoulder. I have also shown separate cup rings 73 and 74 and dust covers 76 and 77 although these parts can be formed integral with the hub 33 if desired. This form of double ball bearing for carrying the wheel can obviously be used with the mechanism of Figs. 2 and 3, although I prefer the simpler arrangement of those figures. The other modifications shown in this Fig. 4 are those due to the fact that the main drive shaft 30, which is carried by bearings 31 and 53 both mounted on the wheel support 27, is connected to the propelling motor of the vehicle by a chain 64 instead of the motor being directly attached to the shaft. The motor or engine is carried over the traction wheel 14 by a frame 38 in the manner disclosed in my application for a patent for a motor vehicle, Serial No. 449,917 filed February 21, 1921. These parts are not fully shown in Fig. 4 as they do not form a part of the present invention. As with this mechanism of Fig. 4 an electric motor can be used to advantage or the transmission or speed change gear can be adjacent to the internal combustion engine, should it be used, I have shown a brake drum 66 attached to the end of the main shaft 30 instead of having the transmission or speed change gear in that position. This brake drum 66 is provided with a brake band 67 which can be applied thereto by means of the lever 17 that is curved so that the pivotal connection to its upper end is made approximately over the axis of pivoting of the wheel support 27 on the axle 13 as hereinbefore described in connection with description of Fig. 1. In order to oscillate the wheel support 27 for steering a lever 22 is shown which is connected to the steering gear in any suitable manner. Fig. 5 clearly illustrates the arrangement of the gearing and of the wheel support pivot.

Having thus described my invention, I claim as new and desire to secure by Letters Patent—

1. In a motor vehicle the combination of a traction wheel, a support for said wheel about which said wheel can rotate, an axle on which said support is pivotally mounted, a propelling motor, means for transmitting the rotation of said motor to said traction wheel, means for controlling the speed of rotation of said wheel mounted on said support, a lever for operating the latter means also pivotally mounted on said wheel support, and a manually operated connection to said lever pivotally joined thereto above said traction wheel and substantially in line with the axis of the said wheel support's pivotal mounting on the axle.

2. In a motor vehicle the combination of a traction wheel, a support for said wheel about which said wheel can rotate, an axle on which said support is pivotally mounted, a propelling motor, means for transmitting the rotation of said motor to said wheel, means for controlling the speed of rotation of said wheel carried by said support, a lever for operating the latter means pivotally mounted on said support, and a manually operated connecting member to said lever pivotally joined thereto above said traction wheel said joint between said connecting member and said lever being movable, when actuating said speed controlling means, on a line substantially intersecting the line of the axis of the said wheel support's pivotal mounting on the axle.

3. In a motor vehicle the combination of a traction wheel, a support for said wheel about which said wheel can rotate, an axle on which said support is pivotally mounted, a propelling motor, means for transmitting the rotation of said motor to said wheel, means for controlling the speed of rotation of said wheel carried by said support, a movable member for operating the latter means also carried by said support, and a manually operated connecting member to said movable member pivotally joined thereto above said traction wheel, said joint between said connecting member and said movable member being movable, when actuating said speed controlling means, on a line substantially intersecting the line of the axis of the said wheel support's pivotal mounting on the axle.

4. In a motor vehicle the combination of a traction wheel, a support for said wheel about which said wheel can rotate, an axle on which said support is pivotally mounted, a propelling motor, means for transmitting the rotation of said motor to said wheel, means for controlling the speed of rotation of said wheel carried by said support, a movable member for operating the latter means also carried by said support, and a manually operated connecting member to said movable member pivotally joined thereto above said traction wheel, said joint between said connecting member and said movable member being movable, when said movable member is moved to bring said speed controlling means into action, into a position approximately intersecting the line of the axis of the said wheel support's pivotal mounting on the axle.

5. In a motor vehicle the combination of a traction wheel, a support for said wheel about which said wheel can rotate, an axle on which said support is pivotally mounted, a propelling motor, means for transmitting the rotation of said motor to said wheel, means for controlling the speed of rotation of said wheel carried by said support, a lever for operating the latter means pivotally mounted on said support, and a manually operated connecting member to said lever pivotally joined thereto above said traction wheel, said joint between said connecting member and said lever being movable, when said lever is moved to bring said speed controlling means into action, into a position approximately intersecting the line of the axis of the said wheel support's pivotal mounting on the axle.

6. In a motor vehicle the combination of a traction wheel, a support for said wheel about which said wheel can rotate, an axle on which said support is pivotally mounted, a propelling motor, means for transmitting the rotation of said motor to said wheel, means for controlling the speed of rotation of said wheel carried by said support, movable members for operating the latter, said means also carried by said support, and manually operated connecting members pivotally joined to said movable members above said traction wheel, said joints between said connecting members and said movable members being movable, when actuating said speed controlling means, on a line substantially intersecting the line of the axis of the said wheel support's pivotal mounting on the axle.

7. In a motor vehicle the combination of a traction wheel, a support for said wheel about which said wheel can rotate, an axle on which said support is pivotally mounted, a propelling motor, means for transmitting the rotation of said motor to said wheel, means for controlling the speed of rotation of said wheel carried by said support, movable members for operating the latter, said means also carried by said support, and manually operated connecting members pivotally joined to said movable members above said wheel, said joints between said connecting members and said movable members being movable, when said movable members are moved to bring said speed controlling means into action, into a position approximately intersecting the line of the axis of the said wheel support's pivotal mounting on the axle.

8. In a motor vehicle the combination of a wheel, a support for said wheel about which said wheel can rotate, an axle on which said support is pivotally mounted, means for controlling the speed of rotation of said wheel carried by said support, a movable member for operating said means also carried by said support, and a manually operated connecting member pivotally joined to said movable member above said wheel said joint between said connecting member and said movable member being movable, when actuating said speed controlling means, on a line substantially intersecting the line of the axis of said wheel support's pivotal mounting on the axle.

9. In a motor vehicle the combination of a wheel, a support for said wheel about which said wheel can rotate, an axle on which said support is pivotally mounted, means for controlling the speed of rotation of said wheel carried by said support, a movable member for operating said means also carried by said support, and a manually operated connecting member pivotally joined to said movable member above said wheel said joint between said connecting member and said movable member being movable, when said movable member is moved to bring said speed controlling means into action, into a position approximately intersecting the line of the axis of the said wheel support's pivotal mounting on the axle.

10. In a motor vehicle the combination of a traction wheel, a support for said wheel about which said wheel can rotate, an axle on which said support is pivotally mounted, a power transmitting shaft rotatably carried by said wheel support and extending through the wheel and geared thereto, a propelling motor having connection with said shaft at one side of the wheel, and means, also having connection with said shaft and on the other side of the wheel from the said connection between said shaft and the propelling motor, for controlling the speed of rotation of said wheel.

11. In a motor vehicle the combination of a traction wheel, a support for said wheel about which said wheel can rotate, an axle on which said support is pivotally mounted, a power transmitting shaft rotatably carried by said wheel support and extending through the wheel and geared thereto, a propelling motor also carried by said wheel support and having connection with said shaft at one side of the wheel, and means, also having connection with said shaft and on the other side of the wheel from the said connection between said shaft and the propelling motor, for controlling the speed of rotation of said wheel.

12. In a motor vehicle, the combination of a frame, a traction wheel, a support for said wheel about which said wheel can rotate, an axle on which said support is pivotally mounted and having connections to said frame at each side of said support, a power transmitting shaft rotatably carried by said support and extending through the wheel and geared thereto, a propelling motor also carried by said support and having connection with said shaft at one side of the wheel, and means, also having connection with said shaft and on the other side of the wheel from the said connection between said shaft and the propelling motor, for controlling the speed of rotation of said wheel.

13. In a motor vehicle, the combination of a traction wheel, a support for said wheel about which said wheel can rotate, an axle on which said support is pivotally mounted, a power transmitting shaft rotatably carried by said support and extending through the wheel, means for transmitting the rotation of said shaft to said wheel, a propelling motor also carried by said support and having connection with said shaft at one side of the wheel, and a speed change gear, connecting said shaft and the means for transmitting the rotation thereof to the wheel and on the other side of the wheel from the said connection between said shaft and the propelling motor, for controlling the speed of rotation of said wheel.

14. In a motor vehicle, the combination of a traction wheel, a support for said wheel about which said wheel can rotate, an axle on which said support is pivotally mounted, a propelling motor mounted on said support at one side of the wheel and having a power transmitting shaft projecting therefrom through said wheel, a speed change gear on the other side of the wheel from the said propelling motor and having connection with said shaft, and means for connecting said speed change gear to said wheel.

15. In a motor vehicle, the combination of a traction wheel, a support for said wheel about which said wheel can rotate, an axle on which said support is pivotally mounted, a propelling motor mounted on said support at one side of the wheel and having a power transmitting shaft projecting therefrom through said wheel, a speed change gear on the other side of the wheel from the said propelling motor and having connection with said shaft and gearing for connecting said speed change gear to said wheel in an intermediate position along said shaft between said propelling motor and said speed change gear.

16. In a motor vehicle, the combination of a traction wheel, a support for said wheel about which said wheel can rotate, an axle on which said support is pivotally mounted, a propelling motor mounted on said support at one side of the wheel and having a power transmitting shaft projecting therefrom through said wheel, a speed change gear on the other side of the wheel from the said propelling motor and having connection with said shaft, a pinion gear connected to said speed change gear and in an intermediate position along said shaft between said propelling motor and said speed change gear, and an internal gear on said wheel and meshing with said pinion gear.

17. In a motor vehicle, the combination of a traction wheel, a support for said wheel about which said wheel can rotate, an axle on which said support is pivotally mounted, a propelling motor mounted on said support at one side of the wheel and having a power transmitting shaft projecting therefrom through said wheel, a speed change gear on the other side of the wheel from said propelling motor and having connection with said shaft, a pinion gear connected to said speed change gear and in an intermediate position along said shaft between said propelling motor and said speed change gear, an internal gear on said wheel and meshing with said pinion gear, and a supporting bearing for said shaft carried by said wheel support and between said pinion gear and said speed change gear.

In witness whereof, I have hereunto set my hand this 23rd day of March, 1921.

ALDEN E. OSBORN.